Feb. 20, 1951     P. DRAMINSKY     2,542,756
TWO-STROKE ENGINE
Filed April 23, 1947
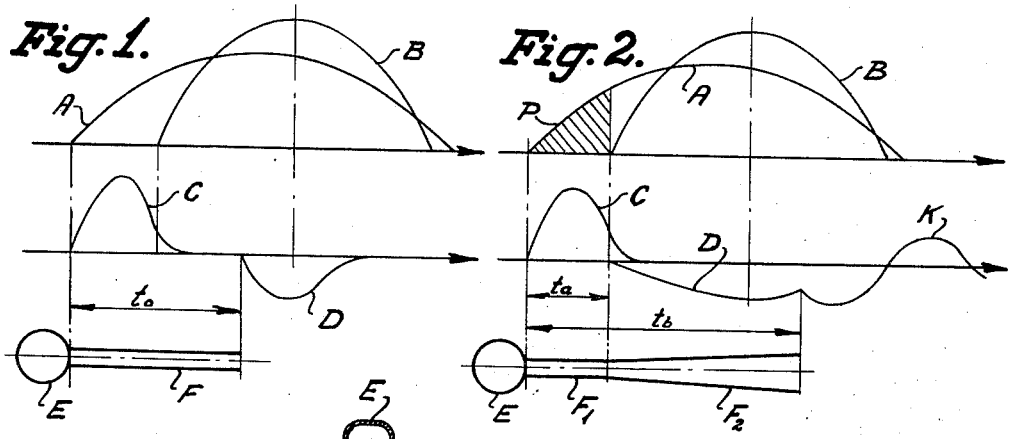
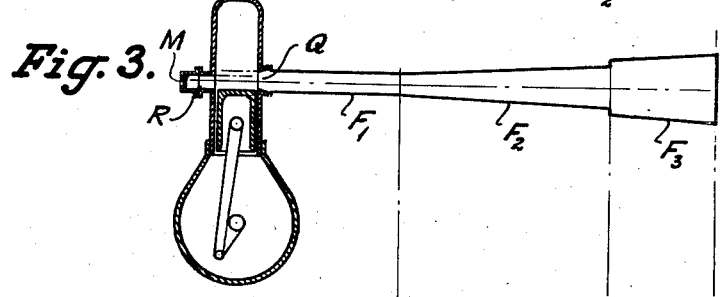
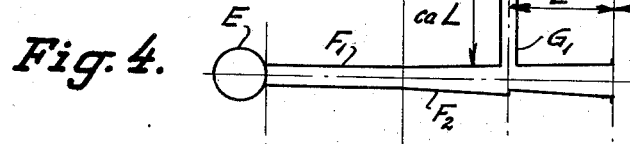
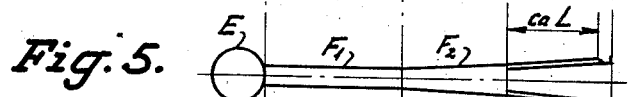
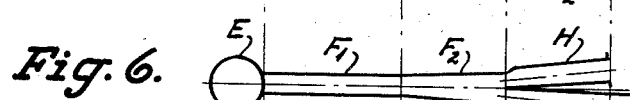
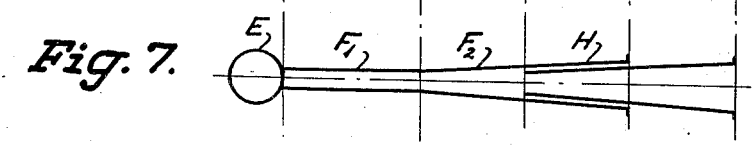
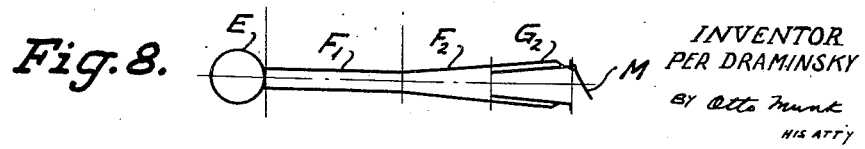
INVENTOR
PER DRAMINSKY
BY Otto Munk
HIS ATTY Patented Feb. 20, 1951

2,542,756

UNITED STATES PATENT OFFICE 2,542,756

TWO-STROKE ENGINE

Per Draminsky, Copenhagen, Denmark

Application April 23, 1947, Serial No. 743,401
In Denmark May 2, 1946

6 Claims. (Cl. 123—65)

The present invention relates to two-stroke internal combustion engines, and has for its main object to utilize the energy of the combustion products to effect scavenging without making use of a scavenging blower.

In internal combustion engines the expansion of the gases is not fully utilized, inasmuch as it is necessary to let the gases leave the cylinder at a rather considerable pressure. If the gases could be expanded down to atmospheric pressure, the efficiency could be increased by some 10–12 per cent.

Immediately on the advent of the first two-stroke engine, many people were thinking of finding some way of utilizing the exhaust energy direct for a simplification of the scavenging, and this would be a logical and natural addition to the two-stroke principle, but so far this task has not been solved in a satisfactory manner. It was therefore found necessary to provide the engine with a blower to supply scavenging air under sufficient pressure, and the use of such a blower has since then been common practice, despite the fact that this involves a loss of some 8–10 per cent of the effective work. Besides, it has through the years proved to be a very difficult problem to construct a perfectly satisfactory and reliable blower; a very large percentage of all breakdowns of two-stroke engines may be ascribed to the blowers.

In recent times it has been suggested that the problem might be solved by transforming part of the exhaust energy into wave energy, a thing that will happen quite automatically if only an exhaust pipe of sufficient length is used for each cylinder. Two, or at most three cylinders may be joined direct and as closely as possible to a common pipe, but these experiments did not lead to the construction of a two-stroke engine which could work without a scavenging blower. During the preexhaust period, when the bulk of the gases flows from the cylinder at a great pressure difference, a powerful pressure wave will occur in the exhaust pipe. The pressure wave will at the speed of sound move out through the pipe and will at the open end of the pipe be reflected into a suction wave which will return to the cylinder and will be able to suck out at any rate part of the gases which still—at atmospheric pressure—fill the cylinder, whereby a corresponding quantity of fresh air will be sucked into the cylinder through the scavenging ports.

Numerous engines provided with scavenging blowers have been constructed with such individual, cylindrical pipes, but no information is available that perfect self-scavenging without the use of a scavenging-air blower has been attained by this method. The principal reason for this is, that the reflection at the end of the pipe is highly ineffective. According to the simple wave theory applying to sound waves, a pressure wave will at the open end of the pipe be reflected into a suction wave of the same magnitude, but this does not by far hold good of the powerful pressure waves occurring in the exhaust pipes and having a superpressure of, e. g. 3–5 atmosphere. Exact calculations prove that the reflected suction wave is only 35–50 per cent of the outgoing pressure wave, to which is added that the suction is of much too short a duration.

A detailed explanation of the invention and the principles on which it is based is given in the following under reference to the drawing in which Figs. 1 and 2 show some diagrams and Figs. 3–8 in schematical form show some exhaust pipes constructed in accordance with the present invention.

Fig. 1 shows the conditions in such an ordinary, cylindrical exhaust pipe of suitable length. At the top the opening area A of the exhaust port and the opening area B of the scavenging ports are plotted as ordinates with the crank angle as abscissa. Below, the pressures prevailing at the exhaust openings of the cylinder have been plotted as ordinates with time plotted along the abscissa, the scales being so chosen that the different points of time along this axis coincide with the crank angles plotted along the abscissa axis above. The curve C indicates the pressure wave emanating from the exhaust ports during the preexhaust period, where the curve D indicates a suction wave formed by reflection as will be explained in detail in the following. At the bottom, the actual cylinder E and the exhaust pipe F are shown schematically. The length of the pipe has on the drawing been plotted equal to the time $t_0$ which it will take for a wave to move out through the pipe and be reflected back to the exhaust openings. The section wave D is of almost the same form as the pressure wave and considerably smaller, but its duration is exactly the same as that of the pressure wave. Now, the duration of the pressure wave approximates very closely to the duration of the preexhaust period, it being a condition that the cylinder pressure has practically been removed when the scavenging ports open, and as the scavenging period is normally of a duration of three or four times the preexhaust period, it will be seen that the suction will be of much shorter duration than the scavenging period. It will thus be impossible with such a pipe to attain sufficient suction effect to give complete self-scavenging, even if the pipe (as indicated at the bottom of the figure) is so exactly adapted in length as to cause the maximum suction to take effect at the exhaust ports at the exact middle of the scavenging period.

The object of the present invention is attained by prolonging the reflected suction wave D, so that its duration will be equal to that of the entire scavenging period. This object is attained by making the exhaust pipe consist of a forepart of constant cross-section and a reflecting part of varying cross-section larger than that of the forepart, in which exhaust pipe the pressure wave emanating from the exhaust ports during the preexhaust period during its passage through the reflecting part will cause a continuous series of reflected suction waves, which on their return to the exhaust ports will set up a suction, the forepart being of such a length that this suction will commence almost simultaneously with the opening of the scavenging ports, whereas the reflecting part is so dimensioned that the suction mentioned will be of a duration equal approximately to the entire scavenging period, so that a scavenging-air blower for the engine may be dispensed with.

The cross-section area of the reflecting part of the exhaust pipe may be varied in many different ways, each of which affords certain constructional advantages, as will be explained in detail in the following:

It may especially be pointed out that the reflecting part of the exhaust pipe may be of gradually increasing cross-section throughout its length or the cross-section area may be increased by stages. Further, the reflecting part of the exhaust pipe may have its cross-section area varied by the provision of closed or open branch pipes, either of which methods will involve constructional advantages. To increase the volume of the reflected suction wave the reflecting part of the exhaust pipe may be provided with a non-return valve.

In connection with this exhaust pipe, the efficiency of which is highly dependent upon the area of the preexhaust, exhaust valves may be used which make it possible to change or adjust the preexhaust area while the engine is running.

Finally it may be observed that the scavenging ports of the engine in combination with the bipartite exhaust pipe according to the invention may be connected with suction pipes for supercharging of the engine.

In pipes with stepwise expansions the reflection will be divided into several smaller but almost equiform reflections which are relatively easy of calculation, but the construction suffers from the defect that at each stage a loss of energy will be sustained in the same way as at the end of the pipe.

Pipes of gradual expansion will therefore be better, but they are more difficult of calculation; and an exact previous calculation is absolutely necessary, as it would be an almost insurmountable task by experiments to find the best dimensions, quite apart from the fact that it is simply impossible to experiment on a self-scavenging engine if the engine cannot work, and it will only be able to do so if the pipe is exactly right. It appears, however, that the equations for the wave motion in pipes of different geometrical shapes, may be solved, so that the calculation will by no means constitute an insurmountable hindrance.

Fig. 2 shows the conditions prevailing in connection with the use of a pipe with a cylindrical forepart $F_1$, and a conical reflecting part $F_2$. The reflection time $t_a$ in the cylindrical part is made almost equal to the preexhaust period. Then comes the pre-reflection from the cone. It is not equiform with the pressure wave but has a smoother course and may be prolonged at will. After the lapse of the period $t_b$, the main reflection from the pipe end will come. This reflection is almost equiform with the original pressure wave and more effective than the reflection from the ordinary cylindrical pipe (Fig. 1), because the velocity of the air current is reduced in the cone, so that the loss of energy at the pipe end will be less.

It will appear from Fig. 2 that the total suction period formed by the cone reflections and the pipe end reflection will take up the entire scavenging period when the total reflection period $t_b$ of the pipe is almost equal to the duration of the scavenging period, whereas the total reflection period $t_o$ of the purely cylindrical pipe shown in Fig. 1 approximates more closely to one-half of the duration of the scavenging period. The period of reflection $t_a$ in the forepart of the pipe, must as mentioned above be almost equal to the duration of the preexhaust period and must not be much shorter, as it appears that too early a pre-reflection is not only useless but directly harmful as it will to some extent counteract the formation of the powerful outgoing pressure wave which forms the mainspring of the action.

The protracted, broken reflection in a pipe like that described in the foregoing with either stepwise or gradual expansion of cross-sectional area, differs also in principle from the simple reflection at the end of a pipe which is cylindrical throughout, in that by the correct dimensioning of the pipe, the result may be attained that the aggregate volume of the reflected suction waves will be considerably greater than the volume of the original pressure wave.

Generally, the gradual expansion of the cross-section of e. g. a conical or hyperbolic pipe is to be preferred (Fig. 3); the extreme end of the pipe will, however, be of relatively large diameter.

It will appear direct from Fig. 2, which rather closely represents conditions in a purely conical pipe, that it would be advantageous to enlarge the pipe somewhat more at the extreme end, whereby the reflected suction waves would assume a smoother course. We will thus obtain a pipe, e. g. like that shown in Fig. 3. The extreme voluminous part, $F_3$, may, however, be dispensed with by means of special artifices as indicated in Figs. 4–8.

In Fig. 3 the exhaust pipe is quite schematically shown in connection with a motorcylinder E. For the sake of exemplifying the invention, a transverse scavenging motor of commonly known construction is shown. The exhaust ports Q are opening a little period prior to the scavenging ports R, whereas means for feeding fuel and air, for ignition and other combustion processes are not shown, as they can be constructed in any known manner, and the present invention is appliable to all sorts of such two stroke motors.

As shown in Fig. 4 the pipe may be shortened by the length L, if at the distance L from the new pipe end we introduce a closed branch $G_1$ of length L, for the theory of the reflection of pressure waves indicates that the pipes shown in Figs. 3 and 4 will have exactly the same effect as regards the reflection of any pressure wave if only the branch is of the right dimensions. The branch may be in the form of an annular space $G_2$ surrounding part of the main pipe as shown in Fig. 5.

Another method of reducing the dimensions is that of using an open branch H, as shown in Fig. 6, in which case the main pipe $F_2$ cannot be shortened. This means, in other words, that the pipe is split up into two open branches, one of which is twice as long as the other. Also this system will when correctly dimensioned give exactly the same reflected suction wave as the pipe shown in Fig. 3.

The short branch may be annular and surround the long branch as shown in Fig. 7.

The reflection theory shows that in all pipes of the nature here described which give broken reflection, the first series of successive suction waves will invariably be succeeded by a rather powerful counterpressure wave K, as shown in Fig. 2.

It is the basic idea of the present invention that at normal revolutions of the engine suction shall prevail in the exhaust pipe immediately at the cylinder throughout the scavenging period, and the pipe would therefore generally be so dimensioned that the said counterpressure wave will not arrive at the cylinder until the exhaust ports are closed (or just about to close). Practical experiments made by the applicant on the self-scavenging system described in this specification show that no advantage will be derived from the supercharging that might be obtained by means of the counterpressure wave, the gases returning from the exhaust pipe being too hot.

By placing a rapid-acting non-return valve M in the exhaust pipe, as shown in Fig. 8, the above-mentioned counterpressure wave may be obviated and it may even thereby be converted into a suction wave. The exhaust pipe may thereby be made somewhat shortened, while the requirement of suction throughout the scavenging period will be fulfilled.

Calculations show that the gradually expanding pipe with a non-return valve is actually the most effective system that can be constructed, provided that the non-return valve is sufficiently rapid in action. On the other hand, a non-return valve placed in a pipe which is cylindrical throughout its length is quite without effect as there will be only one reflection during which the non-return valve is open all the time, and then nothing more happens. An actual counterpressure wave of the kind here described cannot at all occur in a purely cylindrical pipe. The non-return valve may with especial advantage be used in connection with the construction shown in Fig. 5, and the pipe may thus be made somewhat shorter.

By the use of the exhaust pipe for self-scavenging described in the foregoing it is a condition that the area of the exhaust valve and its time of opening are so adjusted that the area of the preexhaust (P in Fig. 2) is of exactly the right size. If it is too small gas will be blown back through the scavenging ports just when they open as the pressure in the cylinder will at that time still be above atmospheric pressure. If the area of preexhaust is too large a vacuum will form in the cylinder before the opening of the scavenging ports, and this vacuum will entirely disturb the desired wave process in the exhaust pipe. It is therefore a salutary measure to introduce a valve in connection with the exhaust port by which the area of preexhaust may be varied while the engine is running. It will thereby be possible to obtain the best possible scavenging effect at varying loads on the engine.

If this measure should not be deemed sufficient a non-return valve M as shown in Fig. 3 can be arranged before the scavenging ports in order to prevent back stroking of combustion gases into the engine room, also by varying load.

Normally the engine would be constructed with scavenging ports opening direct into the open air, but by connecting them with separate suction pipes of suitable length, supercharging may be attained. During the scavenging the suction will cause a quite regular flow of air through the suction pipe, and under the influence of inertia the flow of air will continue even after the suction effect from the exhaust pipe has commenced to recede at the end of the period.

I claim:

1. The combination in two-stroke internal combustion engines provided with exhaust openings and scavenging ports, of an exhaust pipe consisting of a forepart with constant cross-section area and a reflecting part the cross-section area of which increases with the distance from the forepart, and a non-return valve inserted before the said scavenging ports.

2. Exhaust pipe for two-stroke internal combustion engines having exhaust openings and scavenging ports consisting of a forepart and a reflecting part in continuation thereof, said forepart having constant cross-section area and said reflecting part having varying cross-section area larger than that of the forepart, said forepart having such a length, that the continuous series of suction waves produced in the reflection part during the exhaust period and reflected through said forepart, will return to the exhaust openings and here produce a suction beginning almost simultaneously with the opening of said scavenging ports, said reflecting part having such a length, that the said suction will be of a duration almost equal to the duration of the whole scavenging period, said reflecting part being provided with a non-return valve.

3. Exhaust pipe for two-stroke internal combustion engines having exhaust openings and scavenging ports consisting of a forepart and a reflecting part in continuation thereof, said forepart having constant cross-section area and said reflecting part having varying cross-section area larger than that of the forepart, said forepart having such a length, that the continuous series of suction waves produced in the reflection part during the exhaust period and reflected through said forepart, will return to the exhaust openings and here produce a suction beginning almost simultaneously with the opening of said scavenging ports, said reflecting part having such a length, that the said suction will be of a duration almost equal to the duration of the whole scavenging period.

4. Exhaust pipe as claimed in claim 3, the cross-section area of said reflecting part being increasing with the distance from said forepart.

5. Exhaust pipe as claimed in claim 3, said reflecting part being split up in more branches.

6. The combination in two-stroke internal combustion engines provided with exhaust openings and scavenging ports, of an exhaust pipe consisting of a forepart with constant cross-section area and a reflecting part the cross-section area of which increases with the distance from the forepart, and suction pipes leading to said scavenging ports.

PER DRAMINSKY.

REFERENCES CITED

The following references are of record in the file of this patent:

UNITED STATES PATENTS

| Number | Name | Date |
|---|---|---|
| 1,444,547 | Kasley | Feb. 6, 1923 |
| 1,804,321 | Crowe | May 5, 1931 |
| 1,860,569 | Bowne | May 31, 1932 |
| 2,102,559 | Kadenacy | Dec. 14, 1937 |
| 2,123,569 | Kadenacy | July 12, 1938 |

FOREIGN PATENTS

| Number | Country | Date |
|---|---|---|
| 544,569 | France | of 1922 |
| 269,181 | Great Britain | of 1928 |
| 308,593 | Great Britain | of 1930 |
| 324,323 | Great Britain | of 1930 |
| 608,299 | Germany | of 1935 |